Nov. 12, 1968     J. J. HILL     3,411,125
VACUUM RETAINED ELECTRIC PROBE
Filed Nov. 8, 1966
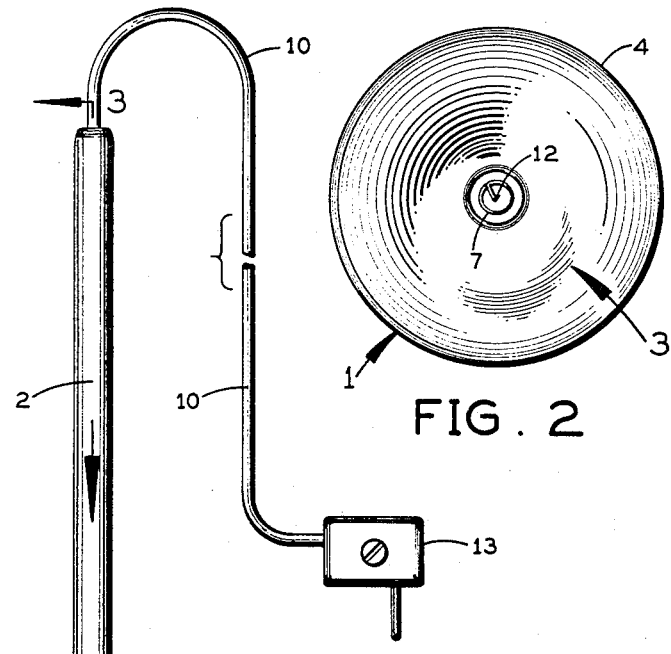
FIG. 1
FIG. 2
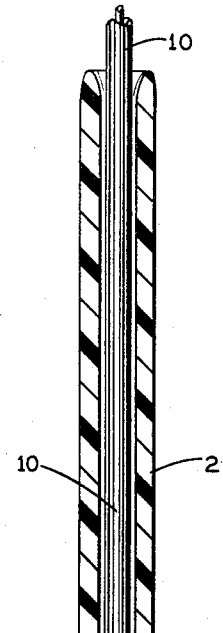
FIG. 3
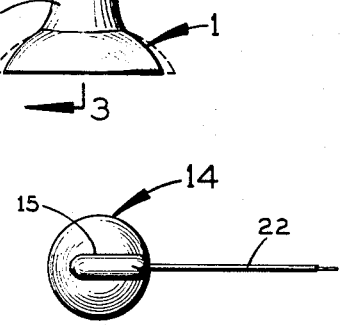
FIG. 4
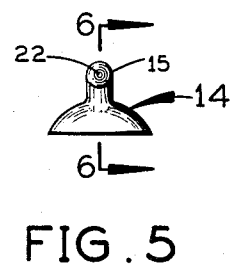
FIG. 5
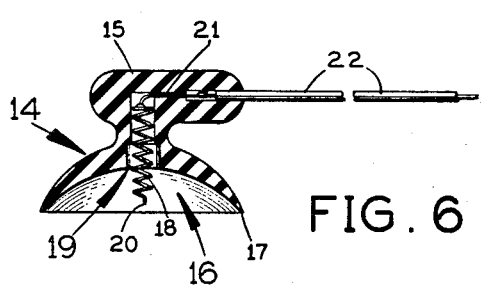
FIG. 6
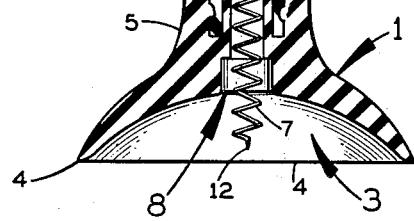
INVENTOR.
JAMES J. HILL
BY
Lloyd Sanders 3,411,125
VACUUM RETAINED ELECTRIC PROBE
James J. Hill, 3750 E. 10th Court,
Hialeah, Fla. 33013
Filed Nov. 8, 1966, Ser. No. 592,820
4 Claims. (Cl. 339—12)

ABSTRACT OF THE DISCLOSURE

The instant device comprises a vacuum cup provided with a coiled spring mounted in a centrally disposed bore in the wall of the cup and having a pointed end extending toward the cup opening. The opposite end of the coiled spring is connected to a wire sealingly extending through the wall of the cup and connected to an insulating wire disposed in the bore of a handle carrying the cup. When applied to a flat surface, the vacuum cup holds the pointed end of the spring in contact therewith.

---

This invention relates in general to electrical test devices and more particularly to a vacuum retained probe for establishing an electric contact.

Prior probes of this general character utilized a contact means terminating either in an alligator clip or a needle-like point. The former was limited to engagement on a terminal, a screw or bare wire, whereas the latter required engagement by manually holding the probe against the conductor under test.

Both of these prior probes present danger of unwanted contact with other conductors and possible damage to the device under test or the test instrument, as well as personal hazard in the case of high voltage testing.

Furthermore, in the case of the pointed probes, it is necessary for the user to hold the probe steady in desired position over protracted periods while making certain meter observations. This procedure often meets with inaccuracies because of variable pressure applied to the probe and displacement of the test contact.

The present invention overcomes the above objections and disadvantages by the provision of an electric test probe in which an electric contact is made by a contact point which is retained in a predetermined position by a dielectric vacuum cup, thus enabling the user to make safe, accurate meter measurements.

A further object of the invention is the provision of a test probe which may be applied to a conductor having a planar surface which will maintain constant low resistance pressure contact over relatively long periods of time.

These and other objects and advantages in two embodiments of the invention are described and shown in the following specification and drawing, in which:

FIG. 1 is a side elevation of the probe connected to a typical flexible test conductor.

FIG. 2 is an enlarged bottom plan view of the probe shown in FIG. 1.

FIG. 3 is an enlarged cross sectional elevation taken through section line 3—3, FIG. 1.

FIG. 4 is a top plan view of an alternate form of probe.

FIG. 5 is a side elevation of the probe shown in FIG. 4.

FIG. 6 is an enlarged cross sectional elevation taken through section line 6—6, FIG. 5.

Referring to FIGS. 1, 2, and 3, a suction cup 1, preferably molded from synthetic rubber or plastic material of predetermined resilience, is retained on the end portion of a tubular dielectric handle 2, either by molding process or retained by suitable adhesive, best shown in FIG. 3.

The suction cup 1 is provided with a substantially spherical cavity 3 in the lower end thereof, as shown, with the body of the cup tapering to a relatively thin circular rim 4 around the periphery thereof. The suction cup terminates in the upper end thereof in an integral coaxial ferrule 5 having a coaxial bore therein for retaining the handle 2. The suction cup also has a cylindrical coaxial stem 6 extending upward in the handle 2 for retaining a coil compression contact spring 7, preferably made of high tensile material, such as beryllium copper. A dual diameter coaxial bore 8 therein, as shown, permits limited movement of the spring when compressed. The straight upper end 9 of the spring 7 extends through the center of stem 6 and is sealed therein for permanent connection to the exposed end of insulated flexible conductor 10 at a junction 11. The conductor 9 usually comprises a plurality of twisted conductors of small diameter to insure flexibility and long life. The lower end of the spring 7 terminates in a sharp point 12. The opposite end of conductor 10 usually terminates in a clip, a terminal or a test plug 13, as illustrated in FIG. 1.

It is apparent from the foregoing that the suction cup element 1 may be made in sizes ranging from one-quarter to several inches in diameter with corresponding changes in the related elements for use in testing a wide range of size of electric conductors, particularly "printed circuits."

In operation the cup 1 is firmly pressed against the conductor by the handle 2 in the direction shown by arrow in FIG. 1, which will expel the air from the cavity 3 in well known manner and simultaneously the point 12 will contact the conductor and result in the compression of spring 8, which compression will assure a low resistance contact of the point 12 with the conductor. The vacuum thus created within the cavity 3 will hold the probe in position until forcibly removed.

In certain instances when conductors having rough surfaces are encountered, it is desirable to moisten the rim 4 of the cup prior to use. A more durable grip of the cup can be maintained by coating the rim 4 of the cup with an oily substance, such as silicone grease.

FIGS. 4, 5, and 6 illustrate an alternate form of probe which has a molded body 14 of resilient material and an integral vertical projection 15 which serves as a finger grip for applying and removing the probe. The body 14 has a cavity 16 in the lower end thereof, substantially the same as that shown in FIG. 3, forming a narrow circular rim 17. A contact spring 18 is retained in a dual diameter cavity 19 coaxial with the body, with the spring terminating at the lower end in a sharp point 20. The upper end portion 21 of the spring 18 is sealed in the projection 15 and secured to the exposed end of a flexible insulated conductor 22, which is retained in a bore of the projection 15, as shown.

It is apparent that when this probe is gripped between thumb and forefinger it may be applied to a conductor and retained thereon with the point 20 in low resistance contact thereto. This particular alternate construction lends itself to complete assembly of the body, spring and conductor by a well known molding process.

It is understood that certain modifications in the above construction, utilizing the features described, are intended to come within the scope of the appended claims.

Having described my invention, I claim:

1. A manual electric probe comprising a resilient body means substantially symmetrical about an axis and having a coaxial cavity in one end thereof,
    said body means having a substantially circular planar outer rim surrounding said cavity with a uniform taper convergent upward toward said axis,
    an elongated handle of predetermined length with an end portion thereof secured coaxially in the end of said body means opposite said cavity, an electric conducting spring means secured and sealed in said body means and terminating in a contact point centrally positioned in said cavity, an insulated conductor having one end portion extending through said handle and connected to said spring means with the opposite end thereof secured to a conducting terminus whereby said outer edge of said body means may be compressed against a planar conducting surface with said contact point urged against said surface and retained thereon by the vacuum formed in said cavity for establishing electrical continuity from said surface to said terminus.

2. A manual electric probe of the character described comprising a means forming a resilient body having an open cavity in one end thereof, said body having a substantially planar circular rim surrounding said cavity for expanded engagement with an electric conducting surface, a handle means secured in and extending from said body opposite said cavity, an electric conducting coil spring means with one end thereof sealed in said body and the opposite end thereof pointed and centrally positioned in and projecting outward from said cavity, an insulated conductor connected to the said one end of said spring means and the opposite end thereof terminating in a test terminus whereby said pointed end of said spring means will be held into contact with said surface by the vacuum in said cavity when said rim is engaged with said surface when said body is manually pressed against said surface.

3. In a probe of the character described a body forming a vacuum cup made from resilient material having an open substantially spherical cavity at one end thereof coaxial with a central axis of said body, said cavity terminating in a substantially circular planar outer edge, said body divergent upward from said edge forming a circular elastic portion around said cavity, a projection integral with said body opposite said cavity for manual gripping, an electric conducting coil spring means centrally positioned in said cavity with one end portion thereof secured and sealed in said body with the outer end thereof projecting therefrom for connection to a test conductor, the opposite end of said spring means projecting outward from said cavity for engagement with a conductor to be tested whereby the manual gripping of said projection and forcing said edge against a conductor will form a partial vacuum in said cavity and hold said opposite end of said spring means against said conductor forming electric continuity from said conductor to said outer end of said spring means.

4. The construction recited in claim 3 including an insulated flexible conductor having one end thereof connected to said outer end of said spring means and the opposite end terminating in a test terminus.

References Cited

UNITED STATES PATENTS 3,329,851   7/1967   Braeutigam et al.

FOREIGN PATENTS 1,090,778  10/1960  Germany.
903,685   8/1962   Great Britain.
237,189   4/1945   Switzerland.

MARVIN A. CHAMPION, *Primary Examiner.*

PATRICK A. CLIFFORD, *Assistant Examiner.*